Dec. 14, 1954     C. E. EVANS     2,697,017
JOURNAL BEARING
Filed July 28, 1951
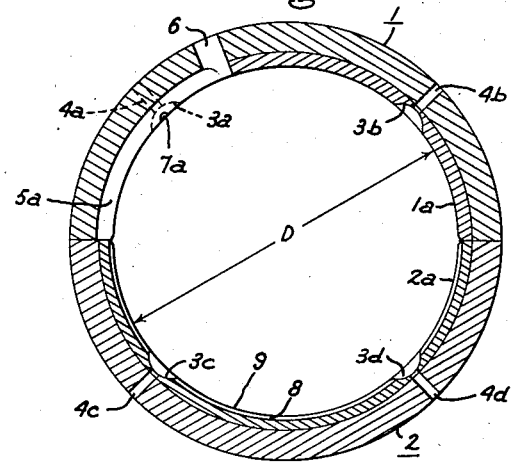
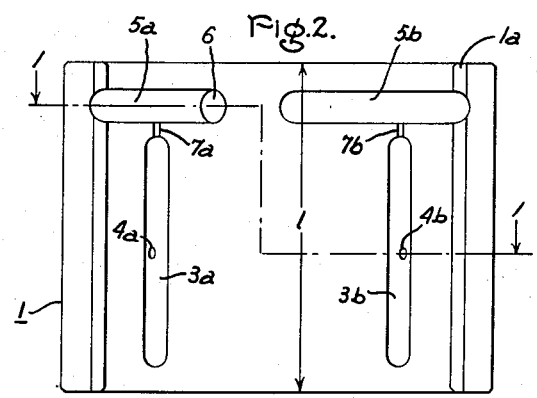
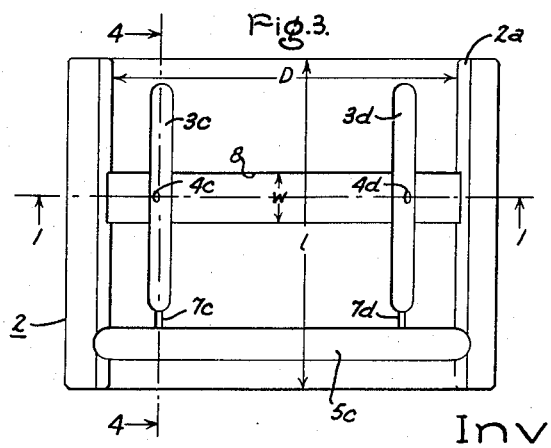 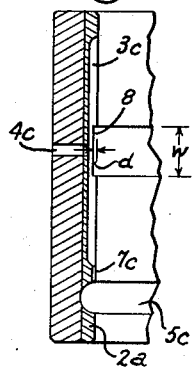
Inventor:
Charles E. Evans,
by *Ernest C. Britton*
His Attorney.

United States Patent Office 2,697,017
Patented Dec. 14, 1954

2,697,017

JOURNAL BEARING

Charles E. Evans, Marblehead, Mass., assignor to General Electric Company, a corporation of New York Application July 28, 1951, Serial No. 239,041

4 Claims. (Cl. 308—237)

This invention relates to journal bearings, particularly to bearings for high speed rotating machinery such as steam turbines, where a rotor is subject to emergency conditions, for instance those resulting from the loss of a bucket, imposing enormous overloads on the bearings.

In the construction of high speed rotors as for elastic fluid turbines, considerable difficulty has been experienced with a hydrodynamic phenomenon which has come to be referred to as "whipping." The vibration phenomenon appears to result from some slight unbalance in the rotor and is permitted, or caused, to build up to an objectionable amplitude by reason of the substantial clearance required between the journal and bearing surface, which clearance is occupied by an oil film of varying thickness and having a certain characteristic pressure distribution, as is familiar to those skilled in the journal bearing art.

Much investigation has been done to ascertain the cause of this whipping, with a view to controlling or eliminating it. A most important criterion affecting the likelihood that whipping troubles will be encountered appears to be the "bearing loading," that is, the total load L on the journal divided by the nominal diameter of the journal D times the axial length of the bearing $l$. Specifically, it is found that in a steam turbine the tendency to whip will become pronounced if the average bearing loading falls much below a critical value on the order of 70 lbs. per sq. in.

Thus it would appear that whipping could be readily avoided by simply keeping the average bearing loading well above some such critical minimum value as 70 lbs. per sq. in., the exact value of which minimum can readily be determined by laboratory testing. However, in turbine design, this is not a complete and satisfactory solution since the rotor of a high performance turbine must be designed so as to cover the possibility that one or more buckets may fail and be thrown from the wheel, in which case the resulting unbalanced vibration forces may impose emergency loads on the bearings of several thousand pounds per sq. in. Such a tremendous increase in loading of course causes the bearing to fail immediately, resulting in serious damage to the machine or even complete destruction thereof. With a turbine rotor having substantial mass and operating at speeds above 10,000 R. P. M., the kenetic energy stored therein is so tremendous that it is exceedingly important, from the standpoint of the safety of the machine and of personnel in the neighborhood, that in the event of an incipient bearing failure the machine shall be capable of operating for at least the few seconds required for the operators, or the automatic safety devices provided, to bring the machine safely to a standstill.

Accordingly, an object of the present invention is to provide an improved journal bearing particularly adapted for high speed turbomachinery which has a sufficiently high average bearing loading in normal operation as to achieve good anti-whip characteristics, but which automatically provides an increased bearing surface in the event emergency overload conditions cause the bearing to begin to fail.

A further object is to provide an improved journal bearing of the type described which may be readily modified after the machine has been completed and tested if it is found that a still higher bearing loading is required to present whipping.

A still further object is to provide a simple arrangement for improving the whipping characteristics of a turbomachine after it has been placed in service without replacing the original journal bearing or requring extensive changes in the rotor structure.

Another object is to provide a journal bearing having good anti-whip characteristics but specially arranged to provide a factor of safety in the event of extreme emergency overloads which will enable the machine to be brought safely to rest.

Other objects and advantages will become apparent from the following description taken in connection with the accompanying drawing, in which Figure 1 is a cross-section view of an improved journal bearing incorporating the invention, Figure 2 is a plan view of the bearing surface of the upper half of the bearing shell, Figure 3 is a plan view of the bearing surface of the lower half of the shell, and Figure 4 is a longitudinal sectional view taken on the plane 4—4 of Figure 3. It will be observed that the full cross section shown in Figure 1 is taken on the irregular cutting plane identified 1—1 in Figures 2 and 3.

Generally, the invention is practiced by so shaping the bearing surface of the journal supporting shell that a primary surface carries the loads ordinarily encountered in normal operation with an average bearing loading sufficiently high to give good anti-whip characteristics, and auxiliary bearing surface being provided which only comes into supporting relation with the journal when the primary bearing surface begins to fail under extreme overload.

Referring now more particularly to the drawing, a journal bearing in accordance with the invention comprises a shell which is divided, in accordance with conventional practice, into two (or in some cases more than two) segments along longitudinal planes. In the present case, the shell is subdivided into an upper half 1 and a lower half 2. Each half is provided with oil supply and drain grooves in accordance with conventional practice, as follows.

Figure 2 shows the arrangement of the oil grooves in the upper half. These include a plurality of circumferentially spaced longitudinal grooves $3a$, $3b$, one of which is shown in full section at $3b$ in Figure 1, while groove $3a$ is shown in dotted lines. These are supplied with suitable lubricating oil from a source (not shown) through supply holes $4a$, $4b$. It will of course be understood that this lubricating oil supply is at a suitable pressure to insure adequate flow of oil to both lubricate and cool the bearing.

Spent lubricating oil is drained from the bearing by means of arcuate grooves $5a$, $5b$. The arcuate groove $5a$ is shown in full section in the upper half of Figure 1. It will be apparent that the upper end of the arcuate drain groove $5a$ communicates with a discharge port 6, whence the oil may be conducted to a cooler, then to the lubricating pump, and back to the supply ports $4a$, $4b$, etc.

The lower bearing shell shown in Figure 3 has similar oil supply grooves $3c$, $3d$ having supply ports $4c$, $4d$. A single drain groove $5c$ extends entirely around the lower bearing half 2 with its end portions cooperating with the arcuate grooves $5a$, $5b$ in the upper bearing half when in the assembled relation shown in Figure 1. Thus it will be apparent that the three arcuate grooves $5a$, $5b$, $5c$ cooperate to establish an oil drain passage around substantially 360° of the bearing. In order to insure a rate of flow of lubricant through the bearing adequate to cool it, small communicating grooves $7a$, $7b$, $7c$, $7d$ may be provided between the ends of the supply grooves $3a$, $3b$, $3c$, $3d$ respectively and the arcuate drain grooves $5a$, $5b$, $5c$. One of these small communicating passages may be seen at $7c$ in Figure 4.

It will be appreciated by those skilled in the bearing art that the average bearing load in a journal bearing of this type is, by definition, equal to $L/lD$, where L is the total load on the journal, D is the nominal diameter of the bearing, and $l$ is the axial length of the bearing. Ordinarily, the effective area of the oil supply grooves 3 and the drain grooves 5 are disregarded in calculating the average bearing load. As indicated above, this average loading must ordinarily be maintained above some predetermined minimum value, which is found to be on the order of 70 lbs. per sq. in. for elastic fluid turbines, if whipping troubles are to be avoided. In accordance with the present invention, the bearing is designed substantially larger than required to produce a bearing loading of this order of magnitude, and then is provided with a relieved portion so that the effective bearing area which normally supports the shaft in ordinary operation is sufficiently smaller to raise the normal effecitve bearing loading to a value above the predetermined minimum. In the present case, this is achieved by providing a circumferentially extending groove shown at 8 in Figure 3 and in section in Figure 4.

It will be observed that the groove 8 extends entirely around the lower half shell only and has a substantial width $w$ in the axial direction and a very small depth indicated by the dimension $d$ in Figure 4. It will also be noticed that this groove is of constant depth throughout its width. This depth is made sufficiently great that the area represented by the groove does not actively participate in supporting the journal in normal operation. Thus the effective bearing loading is determined by the gross area of the lower bearing shell minus the area of the groove 8.

Accordingly, it will be seen that the load-carrying shell, in this case the lower shell 2, has a two-part load carrying surface, a primary surface represented by the art 9 in Figure 1 and a secondary surface represented by the bottom surface of the wide and shallow groove 8. It will be apparent from Figure 3 that the nominal effective area of this secondary surface may be represented by the product of the width of the groove $w$ and the nominal diameter of the bearing D.

The depth $d$ of the groove 8 is exaggerated in the drawing, being actually only a few thousanths of an inch, just enough to increase the thickness of the oil film to such a value that it has no appreciable load-carrying capacity. Specifically, it is found that this depth may be from about .003 to about .008 inches, the average being on the order of about .005 inches. It will also be observed that the depth of this relieved portion 8 is very much less than that of the oil supply grooves 3 and the drain grooves 5. For instance, the oil supply grooves 3 may be on the order of $\frac{1}{10}$ inch deep while the drain groove 5 is on the order of $\frac{1}{8}$ inch deep.

With this arrangement, the operation of the bearing is as follows. In normal operation, the journal is supported by the primary bearing surface 9, the effective bearing loading $[L/D(l-w)]$ being above the predetermined minimum value required to prevent whipping. If then the turbine rotor should throw a bucket or develop an unbalanced condition for some other reason, the excessive bearing loading resulting on the primary surface 9 will cause it to begin to "wipe," that is, fail by reason of the fact that the oil film breaks down, metal-to-metal contact occurs between the journal and the babbitted lining 1a, 2a, whereupon the comparatively soft Babbitt metal wears away, with the generation of a substantial amount of heat. Without the invention, this heat may quickly melt the Babbitt and completely destroy the bearing. However, with the invention, as soon as the bearing has wiped only a few thousandths of an inch, the secondary bearing surface, equivalent to the area of the groove 8, becomes effective to support the journal. Increased by this addition of the secondary bearing area, the load-carrying portion of the journal is enabled to safely support the rotor until the operators can bring the machine to rest. It will of course be appreciated that such rotating machines are provided with warning devices or supervisory instruments responsive to bearing temperature so that the operators are warned of incipient bearing failure by reason of destruction of the oil film and consequent rapid heating of the bearing. Therefore, while the secondary bearing surface may not be adequate to sustain continued operation under emergency overload conditions, it is designed large enough that any overload which may be reasonably anticipated can be carried for the few seconds or minutes required to stop the machine. It is to be noted that the oil supply ports 4c, 4d are in direct communication with the shallow groove 8, so the secondary bearing surface is sure to be lubricated when it comes into load-supporting relation to the journal.

The precise proportions required in a journal bearing incorporating the invention will of course depend upon the nature of the machine, rotational speed, normal bearing loading, the inherent tendency of the shaft to whip, the nature of the lubricant used, and perhaps the arrangement of the lubricating supply and drain grooves. The design of the secondary bearing surface must of course be correlated with the magnitude of the overload expected. However, it may be noted that in one application of the invention, the rotational speed was 10,000 R. P. M. and the journal diameter D was on the order of 2½ inches, the axial length of the bearing was approximately 2 inches, and the groove 8 was .005 to .008 inches deep and ⅝ inch wide. This resulted in a normal bearing area of 3½ square inches, with an emergency overload bearing area of 5 square inches.

Because of the extreme simplicity of the structural modification required, the invention is particularly useful in correcting whipping troubles. For instance, a previously installed turbine having conventional journal bearings and unexpectedly encountering whipping troubles can be repaired by simply removing the bearing shell and machining the groove 8 in the load-carrying segment. Furthermore, a bearing which was designed to incorporate the invention but which, after installation, is found still to have whipping troubles, can be readily modified by simply machining the groove 8 wider so as to increase still further the normal bearing loading. It is also possible to provide a standard journal bearing of a standardized size and configuration, made large enough to cover a number of different turbine sizes, and then adapt this standard bearing to the requirements of the various sizes of turbines by simply machining the groove 8 of a proper width to increase the bearing loading sufficiently to provide "whip-free" operation for the respective turbine rotors involved.

While only one modification of the invention has been described specifically herein, many changes will occur to those skilled in the art. For instance, if the loading on the journal bearing is such that both the upper and lower segments must carry load, then the relieved groove 8 will be provided in both the upper and lower half. Other bearings might be formed in three or more segments, as compared with the simple two-part shell disclosed herein, in which case the relieved groove 8 will be provided in any segments which might have to carry the emergency load. It will also be understood that the precise arrangement shown for the oil supply and drain grooves 3, 4, 5, 6 is not material to the present invention, and that the lubricating groove arrangement shown in the drawings is illustrative of one modification which has been built.

Many other changes will occur to those skilled in the art, and it is desired to cover by the appended claims all such modifications as fall within the true spirit and scope of the invention.

What I claim as new and desire to secure by Letters Patent of the United States is:

1. A journal bearing including a shell having a substantially cylindrical inner surface with lubricant supply and distributing grooves formed therein with a portion of said cylindrical surface constituting a primary load-carrying bearing surface, the shell also forming a shallow recess the bottom of which constitutes a secondary bearing surface of substantial area relative to the primary load carrying surface of the bearing, said recess being disposed in the load-carrying region of the bearing and having a constant depth on the order of .005 inches, whereby, in the event of extreme overloads resulting in wiping of the primary bearing surface, the secondary area comes into load-carrying relation with the journal.

2. A journal bearing in accordance with claim 1 in which the recess forming the secondary load carrying area is in direct communication with at least one oil supply passage whereby lubrication of the secondary area is assured in the event of incident bearing failure.

3. A journal bearing in accordance with claim 1 in which the normal average bearing loading on the primary load-carrying surface is above a preselected minimum on the order of 70 lbs. per square inch, whereby the tendency of the shaft to whip is reduced.

4. A journal bearing including a shell divided into two halves substantially along a longitudinal plane through the axis of the bearing, said half-shells cooperating to define a cylindrical inner surface with lubricant supply and distributing grooves formed therein, one of said halves forming a primary load-carrying bearing surface interrupted by a shallow recess the bottom of which constitutes a secondary bearing surface of substantial area relative to the primary bearing surface, said secondary bearing surface being cylindrical and coaxial with the axis of the bearing, the depth of said recess being in the range from .003 to .008 inches, whereby, in the event of overloads resulting in wiping of the primary bearing surface, said secondary area comes into load-carrying relation with the journal.

References Cited in the file of this patent

UNITED STATES PATENTS

| Number | Name | Date |
|---|---|---|
| 1,900,593 | Wade | Mar. 7, 1933 |
| 1,940,301 | Grobel et al. | Dec. 19, 1933 |
| 2,163,090 | Harry | June 20, 1939 |